W. M. DEXTER.
Stalk-Chopper.
No. 63,868.  Patented Apr. 16, 1867.
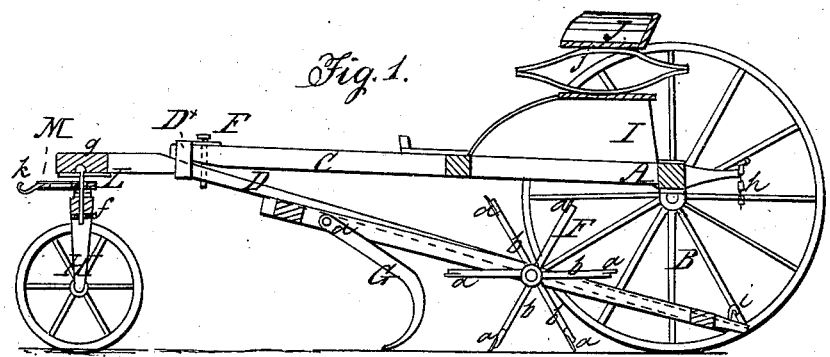
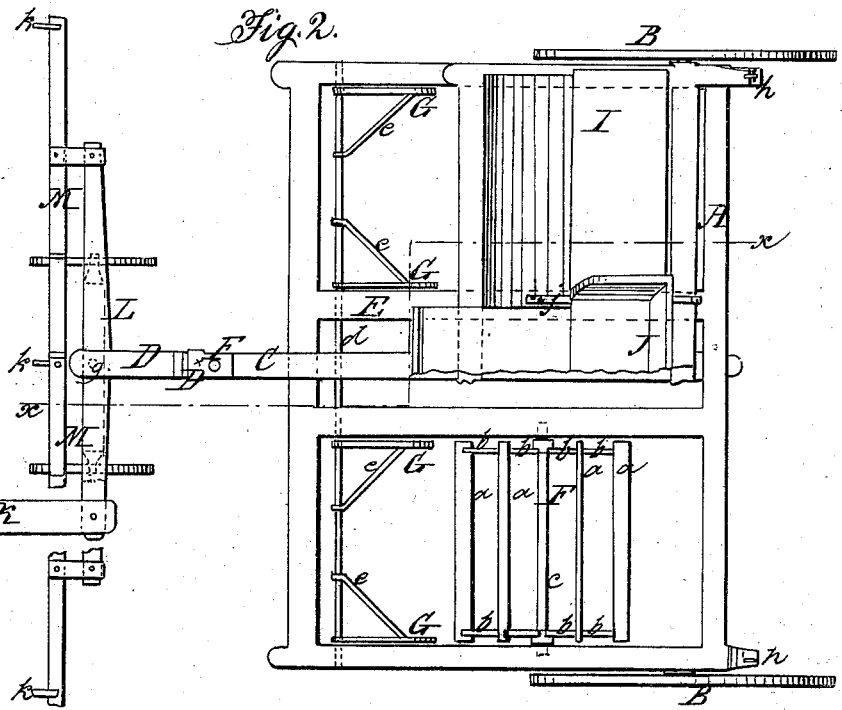
Witnesses:  Inventor:

United States Patent Office.

WILLIAM M. DEXTER, OF AUGUSTA, ILLINOIS, ADMINISTRATOR OF THE ESTATE OF JOHN A. DEXTER, DECEASED, ASSIGNOR TO WILLIAM A. NEWTON.

*Letters Patent No. 63,868, dated April 16, 1867.*

IMPROVEMENT IN STALK-CUTTER.

The Schedule referred to in these Letters Patent and making part of the same.

TO ALL WHOM IT MAY CONCERN:

Be it known that JOHN A. DEXTER, late of Augusta, in the county of Hancock, and State of Illinois, did, during his lifetime, invent a new and improved Stalk-Cutter; and I, WILLIAM M. DEXTER, administrator of the estate of said JOHN A. DEXTER, deceased, of the same place, do hereby declare that the following is a full, clear, and exact description thereof, which will enable others skilled in the art to make and use the same, reference being had to the accompanying drawings, forming part of this specification, in which—

Figure 1 is a side sectional view of this invention, taken in the line $x\ x$, fig. 2.

Figure 2, a plan or top view of the same.

Similar letters of reference indicate like parts.

This invention relates to a new and improved machine for cutting up standing corn-stalks on the field so that they may be ploughed under the soil and rendered available as a manure or fertilizer, thereby avoiding the labor and expense of cutting them by hand and transporting them from the field, or piling them up and burning them.

A represents a horizontal frame, which is mounted on two wheels, B B, and has a tongue or pole, C, projecting centrally from its front end. On the outer end of the tongue or pole C there is fitted a clasp or band, D*, through which a tongue or pole, D, of a rectangular frame, E, passes, the two tongues or poles being connected by a bolt, F. The frame E is considerably larger than the frame A, the former being underneath the latter, and within frame E there are placed two rotary cutters, F F, composed of knives, $a$, secured to the ends of radial arms $b$, which are attached to shafts $c$. The shafts $c$ of these cutters are placed in line with each other, and they are allowed to rotate freely. In the front part of the frame A there is placed transversely a shaft $d$, on which hooks, G, are fitted loosely. These hooks are braced by rods or bars, $e$, as shown clearly in fig. 2, and they are kept down to their work by virtue of their own gravity, as will be understood by referring to fig. 1. The front ends of the frames A E are supported by a truck, H, the axle $f$ of which is connected with the tongue or pole D of frame E by a king-bolt, $g$. The frame A has two boxes, I I, secured upon it directly over the rotary cutters F F. These boxes serve as covers for the cutters F F, and receive the latter, when the frame E is raised and said cutters elevated above the surface of the ground. In moving or transporting the machine from place to place, the frame E is held in an elevated position by means of chains, $h$, attached to each side of the rear of frame A, and fitted into hooks, $i$, at each end of the rear of frame E. The driver's seat J rests upon springs $j\ j$, which are secured to the boxes I I. When the frame E is raised in order to elevate the cutters F F, the hooks G are raised and retained in an elevated state by any suitable fastening. The truck H has a draught-pole, K, attached, and also a splinter-bar, L, to which double-trees, M M, are connected, three whiffle-trees being connected to the double-trees, as indicated by the eyes $k$, the draught-pole being between the near and middle horses. By this arrangement the draught is equalized between the three horses, each horse doing his share of the work and walking in a space between two rows of corn, a cutter, F, operating upon a row, so that two rows of stalks are cut simultaneously. The knives $a$ act in a very efficient manner, severing the standing stalks while the hooks G gather up lodged stalks and bring them within the path of the cutters. In consequence of having the hooks braced they are prevented from shifting or moving laterally, and are retained in proper position.

Having thus described the invention as produced by JOHN A. DEXTER, deceased, what is claimed as new, and for which Letters Patent are desired, is—

The truck H, applied to the tongues or poles C D of the frames A E, in combination with the splinter-bar L and double-trees M M, arranged substantially as and for the purpose set forth.

WILLIAM M. DEXTER.

Witnesses:
W. H. MEAD,
DOOLE GREEN.